(12) United States Patent
Roberge

(10) Patent No.: US 8,127,528 B2
(45) Date of Patent: Mar. 6, 2012

(54) AUXILIARY PROPULSOR FOR A VARIABLE CYCLE GAS TURBINE ENGINE

(75) Inventor: Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 1233 days.

(21) Appl. No.: 12/072,353

(22) Filed: Feb. 26, 2008

(65) Prior Publication Data

US 2009/0211221 A1 Aug. 27, 2009

(51) Int. Cl.
 *F02K 3/02* (2006.01)
(52) U.S. Cl. ............ 60/226.1; 60/263; 60/224; 60/225; 60/226.3; 60/262
(58) Field of Classification Search .......... 60/224, 60/225, 262, 263, 226.3
See application file for complete search history.

(56) References Cited

U.S. PATENT DOCUMENTS

| | | | |
|---|---|---|---|
| 3,693,354 A * | 9/1972 | Hull, Jr. ........................ 60/765 |
| 3,811,791 A | 5/1974 | Cotton | |
| 4,043,121 A | 8/1977 | Thomas et al. | |
| 4,054,030 A * | 10/1977 | Pedersen ........................ 60/262 |
| 4,826,403 A | 5/1989 | Catlow | |
| 4,927,329 A | 5/1990 | Kliman et al. | |
| 4,934,825 A | 6/1990 | Martin | |
| 5,079,916 A | 1/1992 | Johnson | |
| 5,311,736 A | 5/1994 | Lardellier | |
| 5,402,638 A | 4/1995 | Johnson | |
| 5,794,432 A | 8/1998 | Dunbar et al. | |
| 5,806,303 A | 9/1998 | Johnson | |
| 5,809,772 A | 9/1998 | Giffin, III et al. | |
| 6,901,739 B2 | 6/2005 | Christopherson | |
| 6,966,174 B2 | 11/2005 | Paul | |
| 6,968,674 B2 * | 11/2005 | Wollenweber ................. 60/204 |
| 7,216,475 B2 * | 5/2007 | Johnson ....................... 60/226.1 |
| 7,246,484 B2 | 7/2007 | Giffin, III et al. | |
| 2007/0022738 A1 | 2/2007 | Norris et al. | |

FOREIGN PATENT DOCUMENTS

| | | |
|---|---|---|
| EP | 0076192 | 4/1983 |
| GB | 2129502 | 5/1984 |
| GB | 2174761 | 11/1986 |
| WO | 2006059980 | 6/2006 |
| WO | 2006060003 | 6/2006 |

* cited by examiner

*Primary Examiner* — Ehud Gartenberg
*Assistant Examiner* — Craig Kim
(74) *Attorney, Agent, or Firm* — Kinney & Lange, P.A.

(57) ABSTRACT

A core engine of a variable cycle gas turbine engine includes a low pressure spool for generating streams of bypass air and pressurized air, and a high pressure spool for further pressurizing the stream of pressurized air to generate streams of combustion air and supercharged auxiliary air. A peripheral case surrounds the engine case to form a peripheral duct. An auxiliary combustor and propulsor are positioned within the peripheral duct. A bleed duct extends from the high pressure spool to the auxiliary combustor. Variable ductwork directs airflow through the bleed duct and peripheral duct in two modes. A first mode comprises directing the stream of auxiliary air to the auxiliary combustor, and directing stream of inlet air through the peripheral duct. A second mode comprises directing the stream of auxiliary air into the stream of bypass air, and preventing inlet air from entering the peripheral duct.

18 Claims, 2 Drawing Sheets

AUXILIARY PROPULSOR FOR A VARIABLE CYCLE GAS TURBINE ENGINE

CROSS-REFERENCE TO RELATED APPLICATION(S)

Reference is made to a patent application entitled "REAR PROPULSOR FOR A VARIABLE CYCLE GAS TURBINE ENGINE" by Gary D. Roberge, Ser. No. 12/072473, filed on the same day herewith and assigned to the same assignee as the present application.

BACKGROUND

This invention relates to gas turbine engines and, more particularly, to variable cycle engines that balance supersonic and subsonic performance.

A conventional multi-spool gas turbine engine has three basic parts in an axial, serial flow relationship: a core compressor to pressurize air entering into an inlet portion of the engine, a core combustor to add fuel and ignite the pressurized air into a propulsive gas flow, and a core turbine that is rotated by the propulsive gas flow, which in turn rotates the core compressor through a core shaft extending between the core turbine and the core compressor. The core compressor, the core turbine, the core combustor and the shaft are collectively referred to as the core engine.

Gas turbine engines intended for use in aircraft typically collect inlet air through an inlet cowling positioned at an upstream or front end of the engine. Typically, the propulsive gas flow is exhausted at a downstream or rear end of the engine through an exhaust nozzle, after flowing axially through the engine. The exhaust gas exits the nozzle at a higher velocity than the velocity of the inlet air thereby producing thrust with the net acceleration of the flow. A gas turbine engine that utilizes the core engine to accelerate all of the entering flow to produce thrust is typically referred to as a turbojet engine. The force, or thrust, generated by a turbojet is increased by either increasing the exhaust gas velocity or increasing the mass of air flowing through the engine. Gas turbine propulsive efficiency is directly related to the velocity of the exhaust leaving the engine in comparison with vehicle flight speed. Thus, turbojet engines with typically high exhaust velocities are well suited to producing high efficiency at supersonic speeds, and are somewhat inefficient at low speeds.

The thermodynamic efficiency of a turbojet engine can be altered by adding one or more, lower pressure compressors upstream of the higher pressure core compressor; one or more, lower pressure turbines downstream of the higher pressure core turbine; and low pressure shafts connecting the low pressure turbines and compressors. Such multi-spool engines increase the thermodynamic efficiency of turbojet engines, as the high pressure and lower pressure spools operate at their own optimum speeds and combine to deliver higher overall pressure ratio. Typically, multi-spool engines have either two spools (a low pressure spool and a high pressure spool) or three spools (a low pressure spool, an intermediate pressure spool, and a high pressure spool), but other configuration are possible. This patent application will use a dual-spool gas turbine engine as one example of a multi-spool gas turbine engine. A person of ordinary skill in the art will recognize that the concepts that are discussed in the concept of a dual-spool gas turbine engine are equally applicable to a three-spool gas turbine engine or other multi-spool gas turbine engines.

A turbofan engine, another type of dual-spool gas turbine engine, couples a large diameter fan to the upstream end of the low pressure compressor. Some of the inlet air entering the engine bypasses the core engine and is simply accelerated by the fan to produce a portion of the engine's thrust, while the rest of the air is directed to the core engine to sustain the combustion process and produce an added component of thrust. The ratio of the amount of air going around the core engine to the amount of air passing through the core engine is known as the bypass ratio (BPR). The fan can be used to produce a substantial portion of the total thrust generated by the engine because thrust production is partially dependent on fan airflow and the fan pressure ratio (FPR), the ratio of fan discharge pressure to fan inlet pressure, rather than aircraft speed. The net exhaust velocity is affected by the mixed velocity of the relatively slow fan stream and the core stream and is therefore affected by bypass ratio. Thus, turbofans typically have large BPRs with low to moderate FPR and are well suited to producing high thrust at subsonic speeds, and are somewhat inefficient at high speeds.

Fundamentally, in comparing the two engine types at equivalent thrust levels, turbojet engines accelerate smaller quantities of air to extremely high exhaust velocities to produce thrust, while turbofan engines accelerate larger quantities of air to much lower velocities. Thus, aircraft gas turbine engines have historically been able to perform well—in terms of propulsive efficiency—at either subsonic speeds or supersonic speeds, but not both. At subsonic speeds, it is desirable to have a high BPR and low FPR. At supersonic speeds, it is desirable to have a low BPR and high FPR. Attempts have been made to incorporate the advantages of turbojet and turbofan engines into a single combined cycle engine to achieve efficiency over a broad range of speeds. As such, there is a need for a variable cycle gas turbine engine that operates efficiently over a wide range of operating conditions.

SUMMARY

The present invention is directed to a variable cycle gas turbine engine comprising a core engine, a peripheral case, an auxiliary combustor, an auxiliary propulsor, a bleed duct and variable ductwork. The core engine comprises a low pressure spool for generating a stream of bypass air and a stream of pressurized air, a high pressure spool for further pressurizing the stream of pressurized air to generate a stream of combustion air and a stream of supercharged auxiliary air, and an engine case that surrounds the low pressure spool and the high pressure spool. The peripheral case surrounds the engine case to form a peripheral duct. The auxiliary combustor is positioned within the peripheral duct. The auxiliary propulsor surrounds the engine case downstream of the auxiliary combustor within the peripheral case. The bleed duct extends from the high pressure spool to the auxiliary combustor. The variable ductwork alternatively directs airflow through the engine in a first mode and a second mode. The first mode comprises directing the supercharged auxiliary air to the auxiliary combustor through the bleed duct, and directing inlet air through the peripheral duct. The second mode comprises directing the supercharged auxiliary air into a discharge stream of the core engine, and preventing inlet air from entering the peripheral duct.

DETAILED DESCRIPTION

Figure 1:
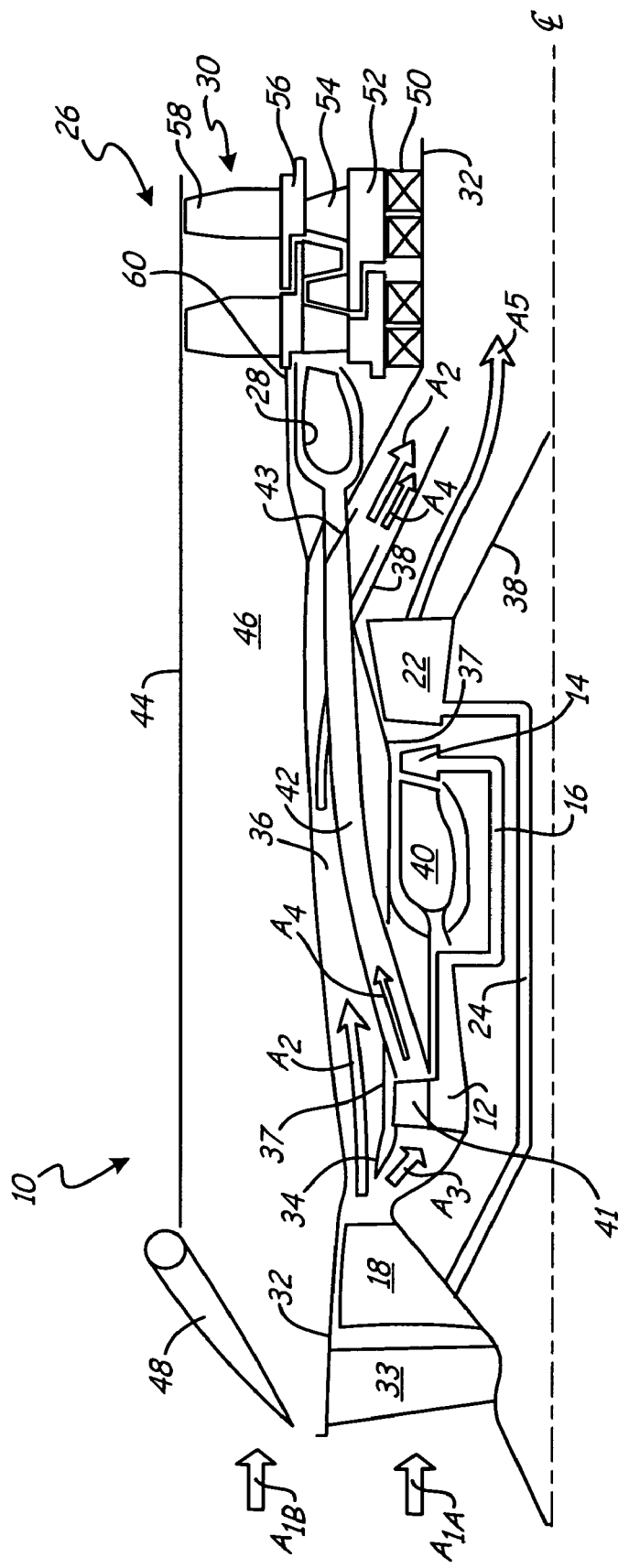
FIG. 1 is a schematic cross-sectional view of a variable cycle gas turbine engine having a peripheral propulsor operating in a high-speed mode.
Figure 2:
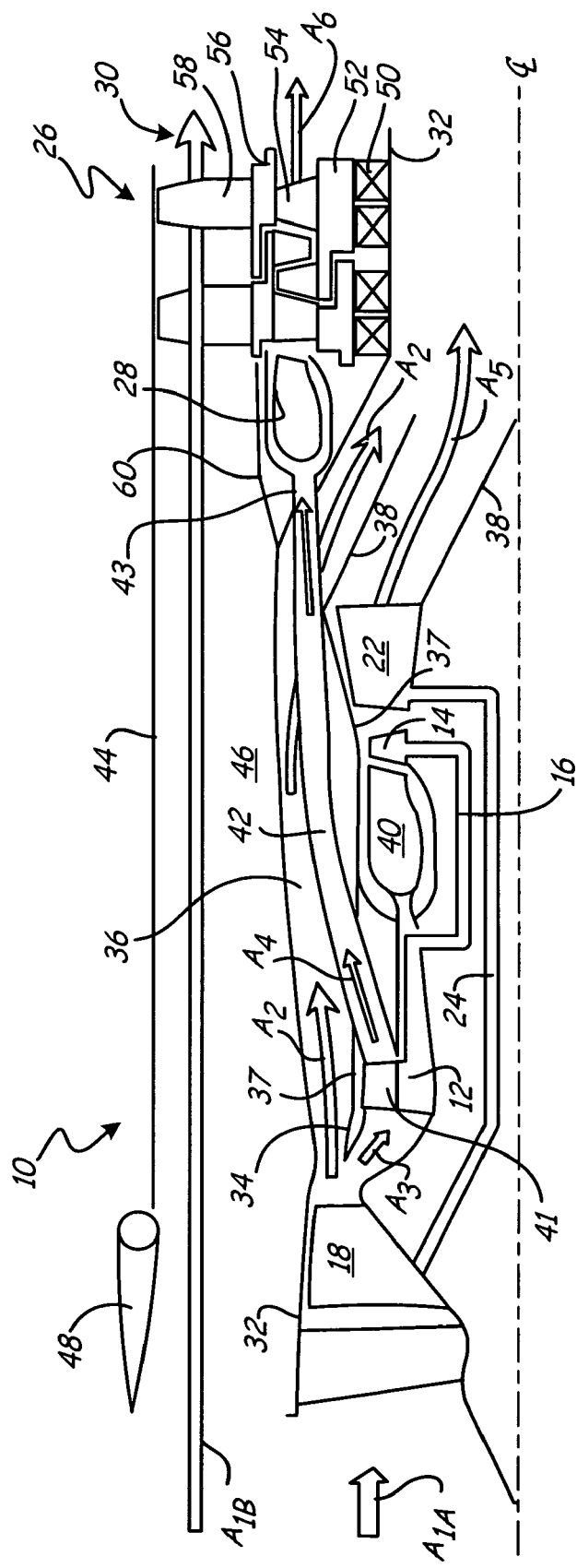
FIG. 2 is a schematic cross-sectional view of a variable cycle gas turbine engine having a peripheral propulsor operating in a low-speed mode.

FIG. 1 shows a schematic view of variable cycle gas turbine engine 10 of the present invention operating in a high-speed mode. Gas turbine engine 10 includes a high pressure spool, which comprises high pressure compressor (HPC) 12, high pressure turbine (HPT) 14 and high pressure shaft 16; a low pressure spool, which comprises fan 18, low pressure turbine (LPT) 22 and low pressure shaft 24; and auxiliary power generator 26, which comprises peripheral combustor 28 and peripheral propulsor 30. As such, engine 10 is configured in a fan-high configuration, but in other embodiments fan-low-high configurations may be used. In the high-speed mode, auxiliary power generator 26 is shut down such that the high pressure spool and the low pressure spool operate with characteristics similar to that of a low bypass ratio turbofan engine. In the low-speed mode, which is described with reference to FIG. 2, a duct system within engine 10 operates to direct air from HPC 12 to auxiliary power generator 26 such that engine 10 operates with characteristics similar to that of a higher bypass ratio turbofan engine. The various components of engine 10 shown in FIGS. 1 and 2 are not to scale and are shown larger or smaller to better illustrate the present invention. Although this patent application uses a dual-spool architecture as an exemplary embodiment, one of ordinary skill in the art will recognize that other embodiments using other engine architectures, such as a three-spool architecture are within the scope of this patent application.

As shown in FIG. 1, variable cycle gas turbine engine 10 includes a main engine case 32 that includes inlet guide vanes (IGVs) 33, into which a first stream of inlet air $A_{1A}$ is received. Main engine case 32 extends from forward of fan 18 to aft of LPT 22, and provides a platform for auxiliary propulsor 30. Flow diverter 34 separates the first stream of inlet air $A_{1A}$ into bypass air $A_2$ and core air $A_3$. The specific volume of inlet air $A_{1A}$ diverted to HPC 12 by flow diverter 34 depends on selected design parameters and varies in different embodiments of the invention. Bypass air $A_2$ is accelerated by fan 18 and directed into primary bypass duct 36 to produce a moderate pressure differential across fan 18. The outer diameter surface of primary bypass duct 36 is formed by engine case 32, while the inner diameter surface of bypass duct 36 is formed by annular wall 37. Annular wall 37 also forms the outer sealing structure for the high pressure spool and LPT 22. Bypass air $A_2$ is exhausted out of engine 10 to produce thrust at exhaust duct 38. After initially being compressed in fan 18, core air $A_3$ is directed to high pressure compressor 12 whereby it is further compressed to produce supercharged air that is directed to combustor 40. The supercharged core air is mixed with fuel and burned within combustor 40 to produce high energy gases for rotating HPT 14 and LPT 22. HPT 14 and LPT 22 are drivingly connected to HPC 12 and fan 18 through shafts 16 and 24, respectively, such that the combustion process can be sustained with pressurized air generated by Fan 18 and HPC 12.

A small amount of bleed air $A_4$ is siphoned from supercharged core air at HPC 12. Exhaust flows $A_5$, $A_2$ and $A_4$ may be optimally mixed (combined) via fixed or variable devices balancing static pressure prior to exit, through a common nozzle 100, or exhausted separately via independent nozzle streams. The first stage blade of HPC 12 includes shrouded tips 41 or a core driven fan stage (CDFS) that pulls a small amount of air from core air $A_3$. Any suitable shrouded tip fan blade as is known in the art may be used with the present invention, such as the CDFS designs described in the aforementioned Johnson '475 patent. In the high-speed mode, bleed air $A_4$ is routed to bleed duct 42, which is positioned within bypass duct 36, where it is exhausted from engine 10 along with bypass air $A_2$ and exhaust gas $A_5$ at duct 38 to produce thrust. Thus, bleed air $A_4$ increases the net fan pressure ratio when combined with fan 18. The volume of core air $A_3$ discharged into bleed duct 42 by the tip shroud of HPC 12 depends on selected design parameters and varies in different embodiments of the invention. Bleed duct 42 includes variable discharge portion 43 that can be configured to route bleed air $A_4$ to peripheral combustor 28 for low-speed mode operation.

Engine 10 also includes peripheral case 44 that circumscribes main engine case 32 to form peripheral duct 46. Peripheral combustor 28 and peripheral propulsor 30 are positioned within peripheral duct 46 between peripheral case 44 and engine case 32. Peripheral duct 46 is configured to receive a second stream of inlet air $A_{1B}$ via a secondary or auxiliary inlet for acceleration by peripheral propulsor 30 to produce thrust. However, in the high-speed mode, peripheral duct 46 is closed off by door 48 such that engine 10 is operable similar to a low bypass turbofan, as described above. Specifically, engine 10 is operated in the high-speed mode to produce a large pressure ratio across fan 18, e.g. the pressure of inlet air $A_{1A}$ at IGV 33 compared to the combined pressure of bypass air $A_2$ and bleed air $A_4$ at exhaust duct 38. Bleed air $A_4$ supplements pressurized bypass air $A_2$ leaving fan 18 such that the net fan pressure ratio (FPR) of engine 10 is increased while the bypass ratio (BPR) remains low. Thus, in high-speed mode engine 10 imparts a large increase in momentum to a majority of inlet air $A_{1A}$ entering engine 10 to produce thrust. As such, engine 10 is configured to achieve better propulsive efficiencies at high, rather than low, speeds when inlet air $A_{1A}$ is already entering IGVs 33 at a high velocity. Gas turbine engine 10, however, includes ductwork that permits engine 10 to operate in low-speed mode such that better efficiency is achieved at low speeds.

FIG. 2 shows a schematic view of variable cycle gas turbine engine 10 of FIG. 1 operating in a low-speed mode such that airflows are directed to auxiliary propulsor 26. Specifically, bleed air $A_4$ is directed to peripheral combustor 28, and a second stream of inlet air $A_{1B}$ is directed to peripheral propulsor 30. Peripheral propulsor 30 includes bearings 50, rotor 52, turbine blades 54, shroud 56 and fan blades 58. In the low-speed mode, door 48 is opened, such as through an actuator controlled by a Full Authority Digital Engine Control (FADEC), to direct a second stream of inlet air $A_{1B}$ to peripheral duct 46, which increases the total volume of inlet air ($A_{1A}$ and $A_{1B}$) provided to engine 10. The specific increase in volume of inlet air ($A_{1A}$ and $A_{1B}$) by the opening of door 48 depends on selected design parameters and varies in different embodiments of the invention. However, in other embodiments, door 48 can be intermittently adjusted to control the amount of inlet air $A_{1B}$ that enters peripheral duct 46. Also in the low-speed mode, the FADEC operates to actuate variable duct portion 43 of bleed duct 42 to direct bleed air $A_4$ into combustor 28 within peripheral duct 46. Variable duct portion 43 of bleed duct 42 comprises any suitable means for redirecting bleed air $A_4$ from bleed duct 42. For example, in one embodiment, bleed duct 42 comprises a plurality of cylindrical ducts that extend from behind shroud tips 41 of the blades of HPC 12 and into bypass duct 36. As such, bypass air $A_2$ is able to flow within bypass duct 36 between the plurality of cylindrical ducts comprising bleed duct 42. In such an embodiment, variable duct portion 43 comprises a hinged duct that is actuated between two positions by, for example, a hydraulic actuator positioned on the outside of bleed duct 42. In a first position, shown in FIG. 1, variable duct portion 43 is rotated inward such that bleed air $A_4$ discharges into bypass duct 36 and the effective pressure ratio across fan 18 is increased. In a second position, shown in FIG. 2, variable duct portion 43 is rotated outward to extend to an opening in engine case 32, which opens to an inlet in peripheral combustor 28. Thus, the pressure ratio across fan 18 is decreased, as the high pressure bleed air $A_4$ is no longer exhausted with bypass air $A_2$, freeing bleed air $A_4$ to supply a combustion process within peripheral combustor 28. However, the total amount of inlet air $A_{1A}$ that bypasses core combustor 40 is increased as door 48 is opened to receive inlet air $A_{1B}$.

Peripheral combustor 28 and propulsor 30 are positioned within peripheral duct 46 to receive bleed air $A_4$ and inlet air $A_{1B}$, respectively, to produce thrust. Typically, in the low-speed mode, gas turbine engine 10 is operating at less than full throttle to sustain the combustion process inside main combustor 40 with core air $A_3$. Thus, HPC 12 has capacity to supply bleed air $A_4$ to peripheral combustor 28. Combustor 28 is positioned at a radially inner portion of peripheral duct 46. In the embodiment shown, combustor 28 is positioned by a portion of engine case 32 that bends in toward the center of engine 10 such that variable duct portion 43 of bleed duct 42 can be extended axially to join with combustor 28. Partition 60 extends from engine case 32 to wall-off combustor 28 from peripheral duct 44 and inlet air $A_{1B}$. In the embodiment shown, combustor 28 comprises an annular combustor configured to receive bleed air $A_4$ from the individual cylindrical ducts comprising bleed duct 42. An annular combustor with such a large diameter suitable for use in the present invention is described in U.S. Pat. App. No. 2007/0022738A1 by Norris et al. and assigned to United Technologies Corporation.

Peripheral propulsor 30 is positioned on engine case 32 downstream of combustor 28. Bearings 50 are provided on engine case 32 such that rotor 52 is able to freely rotate about engine case 32. Any bearings having a high DN number (bearing diameter multiplied by the maximum bearing speed [RPM]) are suitable for use in the present invention. In one embodiment, bearings 50 comprise air bearings as are know in the art having a suitably large DN number. Rotor 52 comprises an annular drum upon which turbine blades 54 and fan blades 58 are mounted. In one embodiment, fan blades 58 are integrally formed at the radially distal end of turbine blades 54. As such, fan blades 58 and turbine blades 54 form a single airfoil blade, with the lower portion configured to receive bleed air $A_4$, and an upper portion configured to push inlet air $A_{1B}$. Any suitable dual-structure airfoil blade as is known in the art may be used with the present invention, such as the FLADE airfoil blades described in the Johnson '475 patent. Shroud 56 separates turbine blades 54 from fan blades 58 and separates airflow within peripheral duct 46. Peripheral propulsor 30 is positioned within peripheral case 44 such that turbine blades 54 align with combustor 28, shroud 56 aligns with partition 60, and fan blades 58 align with peripheral duct 46. In the embodiment shown, peripheral propulsor 30 is split into two-stage, counter-rotating turbine blades and fan blades. In other embodiments, however, synchronous rotating or single-stage blades can be used.

A combustion process is executed in peripheral combustor 28 using bleed air $A_4$ and a fuel to produce exhaust gas $A_6$. In one embodiment, peripheral combustor 28 is provided with fuel from the same source that supplies main combustor 40 using any conventional fuel delivery system. Exhaust gas $A_6$ is expanded through peripheral propulsor 30 such that it impinges upon turbine blades 54 to impart rotation of rotor 52 about engine case 32. Thus, the high pressure bleed air $A_4$ that passes through shrouded tips 41 of HPC 12 is expanded such that a low pressure ratio across turbine blades 54 results. Shroud 56 and rotor 52 prevent exhaust gas $A_6$ from leaking past turbine blades 54, and in one embodiment include overlapping segments to provide a sealing path between the counter-rotating segments. Fan blades 58 are thus driven by turbine blades 54 and perform work on the second stream of inlet air $A_{1B}$ within peripheral duct 46 to increase the pressure ratio across auxiliary propulsor 30. In one embodiment, a pressure ratio of about 2.0 is produced across fan blades 58. Thus, in the low-speed mode, variable cycle gas turbine engine is operable similar to a high bypass turbofan engine. Specifically, a portion of the first stream of inlet air $A_{1A}$, bypass air $A_2$, is used to sustain the combustion process in main combustor 40, while another portion, bleed air $A_4$, is used to produce thrust with fan 18. Inlet air $A_{1B}$ is also accelerated to produce thrust by using supercharged bleed air $A_4$ diverted from HPC 12. Thus, the overall net airflow and bypass ratio of engine 10 is increased. Inlet air $A_{1B}$ and bypass air $A_2$ comprise a majority of the inlet air routed into engine 10 and are accelerated to low velocities. Thus, in the low-speed mode engine 10 imparts a small increase in momentum to large quantity of air, which bypasses main combustor 40, to produce thrust. As such, engine 10 is configured to achieve better propulsive efficiencies at low, rather than high, speeds.

Although the present invention has been described with reference to preferred embodiments, workers skilled in the art will recognize that changes may be made in form and detail without departing from the spirit and scope of the invention.

The invention claimed is:

1. A gas turbine engine comprising:
    a core engine comprising:
        a high pressure compressor having a core driven fan stage;
        a high pressure turbine;
        a high pressure shaft connecting the high pressure compressor with the high pressure turbine; and
        a main combustor disposed between the high pressure turbine and the high pressure compressor;
    a low pressure spool and comprising:
        a low pressure fan disposed upstream of the high pressure compressor,
        a low pressure turbine disposed downstream of the high pressure turbine, and
        a low pressure shaft connecting the low pressure fan with the low pressure turbine;
    a main bypass duct circumscribing the core engine configured to receive discharge from the low pressure fan;
    a peripheral duct circumscribing the main bypass duct configured to receive unpressurized inlet air;
    an auxiliary power system positioned within the peripheral duct, the auxiliary power system comprising:
        a peripheral combustor; and
        a plurality of airfoil blades including turbine portions and fan portions; and
    a bleed duct extending from the high pressure compressor, through the main bypass duct such that flow through the bleed duct is segregated from flow through the main bypass duct, and directly into the peripheral combustor.

2. The gas turbine engine of claim 1 wherein the bleed duct includes a variable position discharge portion that alternatively directs bleed air from the core driven fan stage exclusively to the peripheral combustor or the main bypass duct.

3. The gas turbine engine of claim 1 and further comprising a variable position door connected to an inlet portion of the peripheral duct to control airflow into the peripheral duct.

4. The gas turbine engine of claim 2 wherein the auxiliary power system further comprises:
    a divider for isolating the peripheral combustor from airflow in the peripheral duct such that the peripheral combustor receives only bleed air from the bleed duct;

a mid-shroud positioned on the airfoil blades between the turbine portions and the fan portions, and positioned in axial alignment with the divider;

a rotor upon which the airfoil blades are mounted such that the turbine portions are aligned with the peripheral combustor and the fan portions are aligned with the peripheral duct; and bearings mounted on the main bypass duct upon which the rotor rotates.

5. The gas turbine engine of claim 4 wherein the bearings comprise air bearings.

6. The gas turbine engine of claim 4 wherein the peripheral combustor comprises an annular combustor.

7. The gas turbine engine of claim 1 wherein the airfoil blades comprise multi-stage, counter rotating turbine and fan portions.

8. The gas turbine engine of claim 1 wherein the core driven fan stage of the high pressure compressor includes a shrouded tip to create a supercharged airflow directed into the bleed duct.

9. The gas turbine engine of claim 1 wherein the low pressure spool includes a fan connected to an upstream end of the compressor.

10. A variable cycle gas turbine engine comprising:
a core engine comprising:
a low pressure spool for generating a stream of bypass air and a stream of pressurized air;
a high pressure spool for further pressurizing the stream of pressurized air to generate a stream of combustion air and a stream of supercharged auxiliary air; and
an engine case surrounding the low pressure spool and the high pressure spool, the engine case having a first inlet for receiving a first stream of inlet air and a first outlet for discharging the combustion air and the stream of bypass air from the variable cycle gas turbine engine;
a peripheral case surrounding the engine case to form a peripheral duct having a second inlet for receiving a second stream of inlet air and a second outlet separate from first outlet for discharging the second stream of inlet air from the variable cycle gas turbine engine;
an auxiliary combustor positioned within the peripheral duct; an auxiliary propulsor surrounding the engine case downstream of the auxiliary combustor within the peripheral case and configured to discharge air into the second outlet;
a bleed duct extending from the high pressure spool to an inlet of the auxiliary combustor; and
variable ductwork to alternatively direct airflow through the engine in a first mode and a second mode;
wherein the first mode comprises directing the supercharged auxiliary air to the auxiliary combustor through the bleed duct, and directing inlet air through the peripheral duct; and
wherein the second mode comprises directing the supercharged auxiliary air into the stream of bypass air of the core engine and preventing inlet air from entering the peripheral duct;
a bypass duct positioned within the engine case to direct the bypass air out of the gas turbine engine; and
an exhaust duct disposed within the engine casing to discharge the combustion air from the engine case separate from the stream of bypass air, wherein the bleed duct extends through the bypass duct to connect directly with the auxiliary combustor.

11. The variable cycle gas turbine engine of claim 10 wherein the variable ductwork includes a rotatable duct positioned at a discharge end of the bleed duct to selectively direct the supercharged auxiliary air to either the auxiliary combustor or the bypass duct.

12. The variable cycle gas turbine engine of claim 11 wherein the variable ductwork includes a rotatable door positioned at an inlet end of the peripheral duct to selectively open and close the peripheral duct to inlet air.

13. The variable cycle gas turbine engine of claim 10 and further comprising a divider for isolating the auxiliary combustor from airflow in the peripheral duct such that:
the bypass air flows radially inward of the auxiliary combustor between the engine case and the exhaust duct; and
the second stream of inlet air flows radially outward of the auxiliary combustor between the peripheral case and the divider.

14. The variable cycle gas turbine engine of claim 13 wherein the auxiliary propulsor further comprises:
a plurality of airfoil blades comprising inner turbine portions and peripheral fan portions;
a mid-shroud positioned on the airfoil blades between the turbine portions and the fan portions, and positioned in axial alignment with the divider;
a rotor upon which the airfoil blades are mounted such that the turbine portions are aligned with the auxiliary combustor and the fan portions are aligned with the peripheral duct; and
bearings mounted on the bypass duct upon which the rotor rotates.

15. The variable cycle gas turbine engine of claim 14 wherein the airfoil blades comprise multi-stage, counter rotating turbine and fan portions.

16. The variable cycle gas turbine engine of claim 10 wherein the auxiliary combustor comprises an annular combustor.

17. The gas turbine engine of claim 10 wherein the low pressure spool includes a fan connected to an upstream end of the compressor.

18. A variable cycle gas turbine engine comprising:
a core engine configured as a low bypass ratio turbofan and comprising:
a low pressure spool;
a high pressure spool; and
a bypass duct;
a peripheral duct comprising:
an annular passageway surrounding the bypass duct; and
an inlet door for controlling airflow through the annular passageway;
an auxiliary propulsor comprising:
a peripheral combustor positioned within the peripheral duct; and
an auxiliary propulsor comprising:
a turbine blade portion positioned to receive exhaust gas from the peripheral combustor; and
a turbofan blade portion extending from the turbine blade portion and configured to accelerate air in the annular passageway; and
a bleed duct comprising:
a passageway extending from the high pressure spool; and
an adjustable discharge portion configured to alternately extend to the bypass duct to increase the pressure ratio across the low pressure spool, or the peripheral duct to increase the bypass ratio of the core engine and sustain a combustion process in the peripheral combustor;
wherein exhaust gas of the auxiliary propulsor in the peripheral duct is discharged from the variable cycle gas turbine engine separately from exhaust gas of the high pressure spool in the core engine;
wherein the bleed duct extends through the bypass duct to connect directly with the peripheral combustor.

\* \* \* \* \*